(12) United States Patent
Tatsuda et al.

(10) Patent No.: US 8,496,871 B2
(45) Date of Patent: Jul. 30, 2013

(54) SILICA STRUCTURE AND METHOD OF PRODUCING THE SAME, AND HEAT INSULATING MATERIAL

(75) Inventors: Narihito Tatsuda, Nagoya (JP); Kazuhisa Yano, Nisshin (JP); Takashi Sasajima, Susono (JP); Daisaku Sawada, Gotemba (JP); Eiichi Kamiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 229 days.

(21) Appl. No.: 13/060,346

(22) PCT Filed: Feb. 4, 2010

(86) PCT No.: PCT/IB2010/000221
§ 371 (c)(1),
(2), (4) Date: Feb. 23, 2011

(87) PCT Pub. No.: WO2010/089654
PCT Pub. Date: Aug. 12, 2010

(65) Prior Publication Data
US 2011/0278756 A1    Nov. 17, 2011

(30) Foreign Application Priority Data

Feb. 5, 2009    (JP) .................................. 2009-025272

(51) Int. Cl.
*B28B 1/00*    (2006.01)
(52) U.S. Cl.
USPC ........... 264/681; 264/610; 264/624; 264/669; 264/670; 264/44

(58) Field of Classification Search
USPC ................. 264/610, 624, 628, 669, 670, 681, 264/44
See application file for complete search history.

(56) References Cited

U.S. PATENT DOCUMENTS

| | | | | |
|---|---|---|---|---|
| 3,417,028 A | * | 12/1968 | Montgomery et al. | 252/62 |
| 4,010,242 A | | 3/1977 | Iler et al. | |
| 5,611,848 A | * | 3/1997 | Sasaki et al. | 264/624 |
| 5,900,450 A | * | 5/1999 | Tanaka et al. | 524/493 |
| 5,928,979 A | * | 7/1999 | Inuzuka et al. | 501/120 |
| 6,083,619 A | | 7/2000 | Frank et al. | |
| 7,419,772 B2 | * | 9/2008 | Watkins et al. | 430/325 |

FOREIGN PATENT DOCUMENTS

| | | |
|---|---|---|
| EP | 0 171 722 A2 | 2/1986 |
| JP | A-62-230626 | 10/1987 |
| JP | A-62-297211 | 12/1987 |
| JP | A-10-509941 | 9/1998 |
| JP | A-2002-119855 | 4/2002 |
| JP | A-2004-123412 | 4/2004 |
| JP | A-2004-277195 | 10/2004 |
| WO | WO 96/15998 | 5/1996 |

OTHER PUBLICATIONS

Hrubesh et al., "Dielectric properties of aerogels," Journal of Materials Research, Jul. 1993, pp. 1736-1741, vol. 8—No. 7.
http://www.taiheiyo-cement.co.jp/cement/es/, Jan. 18, 2010.

(Continued)

*Primary Examiner* — Joseph S Del Sole
*Assistant Examiner* — David N Brown, II
(74) *Attorney, Agent, or Firm* — Oliff & Berridge, PLC (57) ABSTRACT

A silica structure includes mesoporous silica spheres; and connection portions each of which includes metal oxide, and each of which connects the mesoporous silica spheres to each other.

5 Claims, 2 Drawing Sheets

OTHER PUBLICATIONS

International Search Report mailed Apr. 29, 2010 issued in International Patent Application No. PCT/IB2010/000221.

Written Opinion of the International Searching Authority mailed Apr. 29, 2010 issued in International Patent Application No. PCT/IB2010/000221.

Urata et al., "Fabrication of Hierarchically Porous Spherical Particles by Assembling Mesoporous Silica Nanoparticles via Spray Drying," Journal of Nanoscience and Nanotechnology, Jul. 28, 2008, pp. 3101-3105, vol. 8—No. 6.

Tadashi et al., "Synthesis and Application of Monodispersed Spherical Mesoporous Silica," Zeolite, Jun. 10, 2008, pp. 59-66, vol. 25—No. 2 (with Abstract).

Japanese Office Action dated May 17, 2011 issued in Japanese Patent Application No. 2009-025272 (with partial translation).

* cited by examiner

SILICA STRUCTURE AND METHOD OF PRODUCING THE SAME, AND HEAT INSULATING MATERIAL

BACKGROUND OF THE INVENTION

1. Field of the Invention

The invention relates to a silica structure and a method of producing the same, and a heat insulating material. More specifically, the invention relates to a silica structure that has high strength, low bulk density, and low heat conductivity, and a method of producing the same, and a heat insulating material including the same.

2. Description of the Related Art

Because pores are formed inside porous materials, the porous materials have low bulk density and low heat conductivity, as compared to dense materials. The porous materials also have high heat resistance, and high corrosion resistance, depending on the qualities of the materials. Therefore, the porous materials are used as a heat insulating material, an acoustic absorption material, a filter, a weight-saving material, an adsorbing material, a catalyst support, and a separation membrane support.

The porous materials and methods of producing the porous materials have been proposed. For example, each of Published Japanese Translation of PCT application No. 10-509941, European Patent Application Publication No. 0171722, and J. Mater. Res. Vol. 8, No. 7, pp. 1736-1741 describes silica aerogel in which solid silica particles with diameters equal to or smaller than 100 nm are connected to each other in a mesh manner. Also, in http://www.taiheiyo-cement.co.jp/cement/es, a hollow particle, which has a shell made of ceramic containing silica as a main component, is described. In this site, a relatively large hollow particle with a diameter equal to or larger than 20 μm is described. The bulk density of the hollow particles is 0.25 to 0.42 g cm$^3$, and the compressive strength of the hollow particles (when 40% remains) is 70 N/mm$^2$, and the heat conductivity of the hollow particles is 0.1 W/m ° C. Further, Japanese Patent Application Publication No. 2004-123412 (JP-A-2004-123412) describes a method of producing a small spherical zeolite formed body, using alumina sol as a binder. Japanese Patent Application Publication No. 62-297211 (JP-A-62-297211) describes a method of producing a zeolite porous material using alumina sol as a binder.

The porous material, in which silica aerogel is used, contains a large amount of voids between the particles. Therefore, it is possible to decrease the bulk density of the porous material. However, the strength of the porous material is decreased in accordance with the decrease in the bulk density. In order to obtain sufficient strength, it is necessary to improve a filling rate. However, in this case, the bulk density of the porous material is increased, and heat conductivity of the porous material is increased. A hollow particle that includes a shell made of ceramic, such as a foamed glass bead, has strength due to the shell. Therefore, even when the diameter of the hollow particle is decreased, the shell needs to have a certain thickness to maintain the strength. However, if the diameter of the particle is decreased while maintaining the thickness of the shell at the certain thickness, the proportion of the volume of the shell to the volume of the hollow particle is increased. When using the hollow particle with a relatively large diameter as described in http://www.taiheiyo-cement-.co.jp/cement/es, it is possible to decrease the density of the particle and the heat conductivity of the formed body to low values. However, as the diameter of the hollow particle is decreased, the density of the particle is increased, and as a result, the bulk density of the porous material is increased, and the heat conductivity of the porous material is increased. Similarly, it is difficult to significantly decrease the bulk density and the heat conductivity of the porous material produced by connecting zeolite particles with diameters equal to or smaller than 1 μm using alumina sol, while maintaining the strength.

SUMMARY OF THE INVENTION

The invention provides a silica structure that has high strength, low bulk density, and low heat conductivity, and a method of producing the same, and a heat insulating material including the silica structure.

A first aspect of the invention relates to a silica structure that includes mesoporous silica spheres; and connection portions each of which includes metal oxide, and each of which connects the mesoporous silica spheres to each other. A second aspect of the invention relates to a heat insulating material that includes the silica structure according to the first aspect of the invention.

A third aspect of the invention relates to a method of producing a silica structure. The method includes mixing mesoporous silica spheres, in which pores are filled with a masking material, with a liquid containing a reactive binding agent to produce a mixture; shaping the produced mixture; causing the reactive binding agent to react to form connection portions each of which includes metal oxide, and each of which is located between the mesoporous silica spheres; and removing the masking material from the pores.

Because the mesopores are formed inside the mesoporous silica spheres, the bulk density of the mesoporous silica, spheres is low, and the heat conductivity of the mesoporous silica spheres is low. Also, the mesoporous silica spheres have high rigidity. Particularly, the mesoporous silica spheres with radially-arranged pores and/or monodispersity have high rigidity, and in addition, the bulk density, the heat conductivity, and the strength of the mesoporous silica spheres with radially-arranged pores and/or monodispersity are not greatly changed even when the diameters of the mesoporous silica spheres are changed. The silica structure, in which the mesoporous silica spheres are connected by the connection portions, has high strength, low bulk density, and low heat conductivity. Particularly, when the mesoporous silica spheres with radially-arranged pores and/or monodispersity are connected to each other substantially at a point, it is possible to reduce the heat conductivity to a low value, while achieving high rigidity and low bulk density.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described in detail.

1. Silica Structure

A silica structure includes mesoporous silica spheres, and connection portions each of which connects the mesoporous silica spheres.

1.1 Mesoporous Silica Sphere

1.1.1 Composition

The mesoporous silica sphere (hereinafter, referred to as "MSS") may contain only silica, or may contain silica that is a main component, and an oxide of a metal element $M_1$ other than silica. The metal element $M_1$ is not particularly limited. However, it is preferable that the metal element $M_1$ should be a metal element that can form a divalent or higher metal alkoxide. When the metal element $M_1$ is a metal element that can form a divalent or higher metal alkoxide, a spherical particle that contains the oxide of the metal element $M_1$ is easily produced. Examples of the metal element $M_1$ include Al, Ti, Mg, and Zr.

1.1.2 Shape

The word "spheres" signifies that when a plurality of particles (preferably twenty or more particles) produced under the same condition are observed by a microscope, the average value of sphericities of the particles is equal to or lower than 13%. The "sphericity" is an index indicating the degree of deviation of the outline of each particle from a perfect circle. The sphericity is represented by a ratio $\Delta r_{max} \times 100/ro$ (%) that is a ratio of the maximum value ($\Delta r_{max}$) among distances between the minimum circumscribed circle that contacts the surface of each particle, and points on the surface of the particle in a radial direction, to a radius (ro) of the circumscribed circle. By employing a method described later, it is possible to produce the spherical particle whose sphericity is equal to or lower than 7%, or the spherical particle whose sphericity is equal to or lower than 3%.

1.1.3 Monodispersity

The word "monodispersed" signifies that a monodispersity degree represented by a formula (1) described below is equal to or lower than 10%. More preferably, the monodispersity degree is equal to or lower than 5%.

The monodispersity degree=(the standard deviation of particle diameters)×1.00/(the average value of the particle diameters)    (1)

The MSSs do not necessarily need to be monodispersed MSSs. However, if the silica structure is produced using the MSSs whose particle sizes are widely dispersed, distances between the particles are not uniform, and the number of contact points between the particles increases. As a result, the heat conductivity of the silica structure increases. If the silica structure is produced using the monodispersed mesoporous silica spheres (MMSS), distances between the particles are relatively uniform, and the number of the contact points between the particles is relatively small. This makes it easy to maintain the heat conductivity of the silica structure at a low value.

1.1.4 Pores

It is preferable that the pore diameter of the MSS should be 1 to 10 nm. In general, as the pore diameter becomes larger, the silica structure with lower bulk density and lower heat conductivity is produced. The pore volume of the MSS is not particularly limited. In general, as the pore volume becomes larger, the silica structure with lower bulk density and lower heat conductivity is produced. In general, the pores of the MSS have a nano-order honeycomb shape with a high degree of regularity. The arrangement of the pores varies depending on a production condition under which the MSS is produced. Particularly, the MSS or the MMSS with the radially-arranged pores has the following features. (1) Because the MSS or the MMSS receives an external force in a lengthwise direction of the cylindrical pore, no matter in which direction the MSS or the MMSS is deformed, the MSS or the MMSS has high rigidity. (2) Even when the particle diameter is decreased, the structure is not changed. Therefore, the MSS or the MMSS has high rigidity regardless of the particle diameter. Accordingly, the MSSs or the MMSSs with the radially-arranged pores are a particularly appropriate material used to form the silica structure. The "radially-arranged pores" signifies the pores that extend from the center of the sphere toward the periphery of the sphere, and that are radially arranged.

1.1.5 Particle Diameter

The diameters of the MSSs influence the heat conductivity of the silica structure. In general, if the diameters of the MSSs (MMSSs) are extremely large, gaps between the MSSs become extremely large, and thus, it is not possible to suppress heat transfer in air. As a result, the heat conductivity of the silica structure becomes high. In order to produce the silica structure with low heat conductivity, it is preferable that the diameter of the MSS should be equal to or smaller than 2 μm.

1.2 Connection Portion

1.2.1 Composition

Each of the connection portions connects the MSSs, and includes metal oxide. The composition of the metal oxide that constitutes the connection portion is not particularly limited. In the invention, "metal oxide" includes oxides of transition metal elements, oxides of typical metal elements, and oxides of semimetals such as Si. Examples of the metal oxide that constitutes the connection portion include silica, alumina, titania, magnesia, and zirconia. The connection portion may include any one of the oxides, or may include a mixture or a solid solution of two or more of the oxides.

1.2.2 Shape of the Connection Portion

The shape of the connection portion is not particularly limited. When a disc-shaped connection portion with a relatively large radius is provided between the MSSs, the MSSs are in surface contact with the connection portion. Because heat transfers between the MSSs through the connection portion, as a contact area between each MSS and the connection portion becomes larger, the heat conductivity of, the silica structure becomes higher. Accordingly, in order to produce the silica structure with low heat conductivity, it is preferable that each of the connection portions should connect the MSSs to each other at a contact point. The phrase "each of the connection portions connects the MSSs to each other at a contact point" signifies that the MSSs are connected to each other through the connection portion with a relatively small area substantially at a point. In order to produce the silica structure with high strength, low bulk density, and low heat conductivity, a ratio ($S_2/S_1$) of the maximum area ($S_2$) of the connection portion to the maximum sectional area ($S_1$) of the MSS is preferably equal to or tower than one-fourth, and more preferably equal to or lower than one-tenth.

1.3 Characteristics

The silica structure, in which the MSSs are connected through the connection portions, has high strength, low bulk density, and low heat conductivity. When the structure of the MSS and the structure of the connection portion are optimized, the bulk density of the silica structure is equal to or lower than 0.60 g/mL, or equal to or lower than 0.50 g/mL. Also, when the structure of the MSS and the structure of the connection portion are optimized, the compressive strength of the silica structure is equal to or higher than 10 MPa, equal to or higher than 15 MPa, or equal to or higher than 20 MPa. Further, when the structure of the MSS and the structure of the connection portion are optimized, the heat conductivity of the silica structure is equal to or lower than 0.10 W/mK, or equal to or lower than 0.07 W/mK.

2. Heat Insulating Material

A heat insulating material according to the embodiment of the invention includes the silica structure according to the embodiment of the invention. Because the silica structure according to the embodiment of the invention has high strength, low bulk density, and low heat conductivity, the heat insulating material may be used as a heat insulating material, an acoustic absorption material, a filter, a weight-saving material, an adsorbing material, a catalyst support, and a separation membrane support.

3. Method of Producing the Silica Structure

A method of producing the silica structure according to the embodiment of the invention includes a mixing step, a shaping step, a reaction step, and a removal step.

3.1 Mixing Step

In the mixing step, the mesoporous silica spheres, in which the pores are filled with a masking material, are mixed with a liquid containing a reactive binding agent.

3.1.1 Masking Material

As the masking material supplied into the pores of the mesoporous silica spheres (MSS), any material may be used as long as the material can be decomposed and removed. Examples of the masking material include (1) a surfactant agent and/or a diameter-increasing agent used when the MSS is synthesized; (2) a polymer that is newly supplied into the pores of the MSS after the surfactant agent and/or the diameter-increasing agent are/is removed (examples of the polymer includes polyfurfuryl alcohol (a furfuryl alcohol polymer), dehydration condensation products of saccharides such as sucrose, addition polymers such as polystyrene and PMMA, and condensation polymers such as polyamide and polyester. Any polymer may be used as the masking material as long as the polymer is produced by introducing a monomer in the form of a gas, a liquid, or a solution into the pores, and polymerizing the monomer in the pores, or the polymer can be dissolved in a solvent, and introduced into the pores, and can be decomposed and removed by aftertreatment); (3) an organic substance that is newly supplied into the pores of the MSS after the surfactant agent and/or the diameter-increasing agent are/is removed (examples of the organic substance include ethylene carbonate. Any organic substance may be used as the masking material, as long as the organic substance can be introduced into the pores by dissolving or melting the organic substance, and can be decomposed and removed by aftertreatment); and (4) a highly viscous solution that is newly supplied into the pores of the MSS, after the surfactant agent and/or the diameter-increasing agent are/is removed (examples of the highly viscous solution include a N-methylpyrrolidone (NMP) solution of polyvinylidene fluoride (PVDF) and a toluene solution of PMMA. Any highly viscous solution may be used as the masking material, as long as the highly viscous solution can be introduced into the pores, and can be decomposed and removed by aftertreatment). However, the masking material is not limited to the above-described materials. Any material may be used as the masking material, as long as the material can be introduced into the pores, and can be decomposed and removed by aftertreatment.

As described later, the MSSs are produced by (1) mixing a source material containing a silica source material and a surfactant agent in a solvent to produce precursor particles containing the surfactant agent; (2) performing treatment in which a diameter-increasing agent is added to the precursor particles to increase the pore diameters of the precursor particles, as required; and (3) removing the surfactant agent and/or the diameter-increasing agent from the precursor particles. As a starting material used to produce the silica structure, the precursor particles, in which the pores are filled with the surfactant agent and/or the diameter-increasing agent, may be used without changing the precursor particles. Alternatively, after the surfactant agent and/or the diameter-increasing agent are/is removed from the pores, a polymer or an organic substance may be supplied into the pores. When a polymer or an organic substance in the form of a liquid, or a solution of a polymer or an organic substance is added to the MSS from which the surfactant agent has been removed, the polymer or the organic substance is adsorbed in the pores of the MSS.

3.1.2 Reactive Binding Agent

The reactive binding agent is a compound that includes a functional group that can be bonded to a silanol group on the surface of the MSS, or generates a functional group that can be bonded to the silanol group on the surface of the MSS through a reaction, and that can form metal oxide in reaction to an external stimulus such as heat or light. Examples of the reactive binding agent include (1) silica source materials, which may be used to synthesize the MSS (for example, tetraalkoxysilane such as tetramethoxysilane (TMOS) and tetraethoxysilane (TEOS), trialkoxysilane such as trimethoxysilanol and triethoxysilanol, and dialkoxysilane such as dimethoxydiphenylsilane and diethoxydimethylsilane, as described below); (2) source materials which contain the metal element $M_1$ used to synthesize the MSS (fox example, alkoxides containing Al, Ti, Mg, Zr, and the like, and alkoxides containing Sn, Ge, W, Zn, and the like as described below); (3) source materials (for example, trichloromethylsilane, trichloroethylsilane, and dichlorodimethylsilane) containing a functional group that reacts with a silanol group, such as an amino group, an alcoholic hydroxyl group, an epoxy group, and a chloro group, and a metal element $M_2$ (for example, Si, Al, Sn, Zr, Ti, Zn, W, and Ge); and (4) salts of metals that form metal oxides through heat decomposition or hydrolysis (for example, nitrate salts such as aluminum nitrate and magnesium nitrate, hydroxides such as zinc hydroxide and copper hydroxide, organic acid salts such as zinc acetate and aluminum lactate). As the reactive binding agent, one of the above-described materials may be used, or two or more of the above-described materials may be used in combination. The reactive binding agent diluted in a solvent may be used, or a solution produced by dissolving the reactive binding agent may be used. Particularly, alkoxides are appropriate materials used as the reactive binding agent, because the alkoxides are easily bonded to the silanol group on the surface of the MSS.

The reactive binding agent in the form of a liquid or the reactive binding agent dissolved in a liquid is used. This is because the reactive binding agent is likely to be located between the MSSs due to the surface tension of the liquid, and the MSSs are likely to be connected to each other at a contact point.

The amount of the added reactive binding agent influences the shape of the connection portion. In the mixing step, it is preferable that the liquid containing, the reactive binding agent should be added so that the MSSs are connected to each other at a contact point. More specifically, in the mixing step, it is preferable that the liquid containing the reactive binding agent should be added so that the amount of the connection portions including metal oxide is equal to or smaller than 40 weight parts with respect to 100 weight parts of the MSSs. It is more preferable that the amount of the added liquid containing the reactive binding agent should be set so that the amount of the connection portions is equal to or smaller than 20 weight parts with respect to 100 weight parts of the MSSs. That is, it is more preferable that the liquid containing the reactive binding agent should be added so that the amount of the connection portions including metal oxide is equal to or smaller than 20 weight parts with respect to 100 weight parts of the MSSs.

3.1.3 Third Component

In the mixing step, only the MSSs in which the pores are filled with the masking material and the liquid containing the reactive binding agent may be mixed with each other. Alternatively, the MSSs, the liquid containing the reactive binding agent, and a third component may be mixed with each other. Examples of the third component include (1) a binder that temporarily bonds the MSSs until the MSSs are strongly connected by the reactive binding agent; and (2) an infrared shielding agent that suppresses transmission of an infrared ray, which causes radiant heat transfer. Examples of the binder include polyvinyl alcohol, methylcellulose, acryl resin, polytetrafluoroethylene (PTFE), and PVDF. Examples of the infrared shielding agent include a material that reflects the infrared ray, such as metal foil, a material that absorbs the infrared ray, such as carbon, and a material that scatters the infrared ray, such as a ceramic material with a high refractive index.

The optimum amount of the added third component is set according to a purpose. For example, when the binder is added as the third component, as the amount of the added binder becomes larger, the porosity of the silica structure becomes higher, and the heat conductivity becomes lower. If the amount of the added binder is extremely large, the porosity becomes extremely high, and it is not possible to suppress heat transfer in air. As a result, the heat conductivity of the silica structure becomes high.

3.1.4 Mixing

A method of mixing the MSSs in which the pores are filled with the masking material, the liquid containing the reactive binding agent, and the third component, which is added as required, is not particularly limited. A mixing condition, under which the MSSs, the liquid containing the reactive binding agent, and the third component are mixed, is not particularly limited. The optimum mixing method and the optimum mixing condition are selected according to the kinds of the materials, the mixing ratio between the materials. By adding the liquid containing the reactive binding agent to the MSSs and the third component, and mixing them under a predetermined condition, a mixture, in which the reactive binding agent is located between the particles of the MSSs, is produced.

3.2 Shaping Step

In the shaping step, the mixture produced in the mixing step is shaped. A method of shaping the mixture is not particularly limited. Various methods may be employed as the shaping method. Examples of the shaping method include a press forming method, a coating method, a spin coating method, a dip coating method, and a roll press method. A shaping condition, under which the mixture is shaped, is not particularly limited. The optimum condition is selected according to, for example, the material composition, the shaping method, and the intended use of the silica structure.

3.3 Reaction Step

In the reaction step, the reactive binding agent is caused to react to form the connection portions each of which is located between the mesoporous silica spheres. When an external stimulus, such as heat and light, is applied to the formed body; the reactive binding agent in the formed body reacts to form the connection portions. A reaction condition, under which the reactive binding agent reacts, is not particularly limited. The optimum reaction condition is selected according to the kind of the reactive binding agent. For example, in the case where the reactive binding agent is an alkoxide such as TMOS or TEOS, when the formed body is heated, the alkoxide is polymerized to form oxide, and thus, the connection portions, each of which connects the MSSs, are formed.

3.4 Removal Step

In the removal step, the masking material is removed from the pores. By removing the masking material after the connection portions are formed between the MSSs, the silica structure according to the embodiment of the invention is produced. A method of removing the masking material is not particularly limited. The optimum removing method is selected according to the kind of the masking material. Examples of the method of removing the masking material include (1) a calcination method in which the silica structure containing the masking material is calcined at 300 to 1000° C. (preferably at 300 to 600° C.) for 30 minutes or longer (preferably for one hour or longer) in the atmosphere or under an inert atmosphere; and (2) an ion exchange method or a solvent extraction method in which the silica structure is immersed in a good solvent (for example, methanol containing a small amount of hydrochloric acid) for the masking material, and is agitated while heated at a predetermined temperature (for example, 50 to 70° C.) so that the masking material is extracted.

4. Method of Producing the Mesoporous Silica Spheres

The MSSs, which function as the starting material used to produce the silica structure, are produced by (1) mixing the source material containing the silica source material and the surfactant agent in the solvent to produce the precursor particles containing the surfactant agent; (2) performing the treatment in which the diameter-increasing agent is added to the precursor particles to increase the pore diameters of the precursor particles, as required; and (3) removing the surfactant agent and/or the diameter-increasing agent from the precursor particles. In this case, by optimizing the production condition under which the MSSs are produced, it is possible to produce the monodispersed mesoporous silica spheres (MMSSs), or the MSSs or the MMSSs with the radially-arranged pores.

4.1 Production of the Precursor Particles 4.1.1 Silica Source Material

Examples of the silica source material include (1) tetraalkoxysilane (silane compounds) such as tetramethoxysilane, tetraethoxysilane, tetraisopropoxysilane, tetrabutoxysilane, and dimethoxydiethoxysilane; (2) trialkoxysilane (silane compounds) such as trimethoxysilanol, triethoxysilanol, trimethoxymethylsilane, trimethoxyvinylsilane, triethoxyvinylsilane, triethoxy-3-glycidoxypropylsilane, 3-mercaptopropyltrimethoxysilane, 3-chloropropyltrimethoxysilane, 3-(2-aminoethyl) aminopropyltrimethoxysilane, phenyltrimethoxysilane, phenyltriethoxysilane, γ-(methacryloxypropyl)trimethoxysilane, and β-(3,4-epoxycyclohexyl) ethyltrimethoxysilane; (3) dialkoxysilane (silane compounds) such as dimethoxydimethylsilane, diethoxydimethylsilane, diethoxy-3-glycidoxypropylmethylsilane, and dimethoxydiphenylsilane, dimethoxymethylphenylsilane; (4) sodium silicate such as sodium metasilicate ($Na_2SiO_3$), sodium orthosilicate ($NaSiO_4$), sodium disilicate ($Na_2Si_2O_5$), sodium tetrasilicate ($Na_2Si_4O_9$), and liquid glass ($Na_2O \cdot nSiO_2$, n=2 to 4); (5) layered silicate such as kanemite (NaHSi$_2$O$_5$.3H$_2$O), sodium disilicate crystal (α, β, γ, δ-Na$_2$Si$_2$O$_5$), makatite (Na$_2$Si$_4$O$_9$), ilerite (Na$_2$Si$_8$O$_{17}$.$x$H$_2$O), magadiite (Na$_2$Si$_{14}$O$_{17}$.$x$H$_2$O), and kenyaite (Na$_2$Si$_{20}$O$_{41}$.$x$H$_2$O); and (6) precipitated silica such as Ultrasil (produced by Ultrasil Corporation), Cab-O-Sil (produced by Cabot Corporation), and HiSil (produced by Pittsburgh Plate Glass Company), and fumed silica such as colloidal silica, and Aerosil (produced by Degussa-Huls Corporation).

As the silica source material, hydroxyalkoxysilane may be used. Hydroxyalkoxysilane is a compound in which a hydroxy group (—OH) is bonded to a carbon atom of an alkoxy group of alkoxysilane. As hydroxyalkoxysilane, tetrakis (hydroxyalkoxy)silane that has four hydroxyalkoxy groups, and tris(hydroxyalkoxy) silane that has three hydroxyalkoxy groups may be used. The kind of hydroxyalkoxy group and the number of hydroxy groups are not particularly limited. However, it is advantageous in terms of reactivity to use a hydroxyalkoxy group in which the number of carbon atoms is relatively small (i.e., the number of carbon atoms is 1 to 3), such as a 2-hydroxyethoxy group, a 3-hydroxypropxy group, a 2-hydroxypropoxy group, and 2,3-dihydroxyproxy group.

Examples of tetrakis(hydroxyalkoxy) silane include tetrakis (2-hydroxyethoxy) silane, tetrakis(3-hydroxypropoxy) silane, tetrakis(2-hydroxyproxy) silane, and tetrakis(2,3-dihydroxypropoxy) silane. Examples of tris(hydroxyalkoxy) silane include methyltris(2-hydroxyethoxy) silane, ethyltris (2-hydroxyethoxy) silane, phenyltris(2-hydroxyethoxy) silane, 3-mercaptopropyltris(2-hydroxyethoxy) silane, 3-aminopropyltris(2-hydroxyethoxy) silane, and 3-chloropropyltris(2-hydroxyethoxy) silane. The above-described examples of hydroxyalkoxysilane are synthesized by reacting alkoxysilane with polyhydric alcohol such as ethylene glycol and glycerin (for example, refer to Doris Brandhuber et al., Chem. Mater. 2005, 17, 4262).

It is preferable to use, as the silica source material, tetraalkoxysilane and tetrakis(hydroxyalkoxy) silane among them, because the number of silanol bonds generated by hydrolysis is large, and thus, a strong skeleton is formed. One of the above-described silica source materials may be used, or two or more of the above-described silica source materials may be used in combination. If two or more of the above-described silica source materials are used, the reaction condition may be complicated when the precursor particles are produced. In this case, it is preferable to use only one silica source material.

In the case where the precursor particles contain the oxide of the metal element M$_1$ other than silica, a source material containing the metal element M$_1$ is used in addition to the silica source material. Examples of the source material containing the metal element M$_1$ include (1) alkoxides containing Al, such as aluminum butoxide (Al(OC$_4$H$_9$)$_3$), aluminum ethoxide (Al(OC$_2$H$_5$)$_3$), and aluminum isopropoxide (Al (OC$_3$H$_7$)$_3$), and salts such as sodium aluminate and aluminum chloride; (2) alkoxides containing Ti, such as titanium isopropoxide (Ti (Oi-C$_3$H$_7$)$_4$), titanium butoxide (Ti (OC$_4$H$_9$)$_4$), and titanium ethoxide (Ti(OC$_2$H$_5$)$_4$); (3) alkoxides containing Mg, such as magnesium methoxide (Mg (OCH$_3$)$_2$), and magnesium ethoxide (Mg (IC$_2$H$_5$)$_2$); and (4) alkoxides containing Zr, such as zirconium isopropoxide (Zr(Oi-C$_3$H$_7$)$_4$), zirconium butoxide (Zr(OC$_4$H$_9$)$_4$), and zirconium ethoxide (Zr(OC$_2$H$_5$)$_4$).

4.1.2 Surfactant Agent

The surfactant agent functions as a template for forming mesopores in the particles. The kind of the surfactant agent is not particularly limited, and various kinds of surfactant agents may be used. The structure of the pores in the particles is controlled according to the kind of the used surfactant agent, and the amount of the added surfactant agent.

It is preferable to use at least one kind of quaternary alkylammonium salt, as the surfactant agent. The quaternary alkylammonium salt is represented by the following formula (a).

$$CH_3-(CH_2)_n-N^+(R_1)(R_2)(R_3)X^- \quad (a)$$

In the formula (a), each of R$_1$, R$_2$, and R$_3$ represents an alkyl group with one to three carbon atoms. R$_1$, R$_2$, and R$_3$ may be the same, or may be different from each other. In order to easily forth an aggregate of the quaternary alkylammonium salt (i.e., a micelle), it is preferable that R$_1$, R$_2$, and R$_3$ should be the same. Further, it is preferable that at least one of R$_1$, R$_2$, and R$_3$ should be a methyl group. It is more preferable that all of R$_1$, R$_2$, and R$_3$ should be methyl groups. In the formula (a), X represents a halogen atom. The kind of the halogen atom is not particularly limited. However, it is preferable that X should be Cl or Br, because Cl and Br are easily obtainable. In the formula (a), "n" represents an integer in a range of 7 to 21. In general, as "n" becomes smaller, a center mesopore diameter of the produced MSSs becomes smaller. As "n" becomes larger, the center mesopore diameter becomes larger. If "n" is extremely large, hydrophobic interaction in the quaternary alkylammonium salt is extremely strong. As a result, a layered compound is generated, and a spherical porous material is not produced, "n" is preferably 9 to 17, and more preferably 13 to 17.

It is preferable to use alkyltrimethylammoniumhalide among quaternary alkylammonium salts represented by the formula (a). Examples of alkyltrimethylammoniumhalide include hexadecyltrimethylammonium halide, octadecyltrimethylammonium halide, nonyltrimethylammonium halide, decyltrimethylammonium halide, undecyltrimethylammonium halide, and dodecyltrimethylammonium halide. It is preferable to use alkyltrimethylammonium bromide or alkyltrimethylammonium chloride among them.

When the MSSs are synthesized, one kind of quaternary alkylammonium salt may be used, or two or more kinds of quaternary alkylammonium salts may be used. However, because the quaternary alkylammonium salt functions as the template for forming the mesopores in the MSSs, the kind of quaternary alkylammonium salt greatly influences the shape of the mesopores. In order to form the MSSs with more uniform mesopores, it is preferable to use one kind of quaternary alkylammonium salt.

4.1.3 Solvent

As the solvent, for example, water, organic solvents such as alcohol, and mixed solvents produced by mixing water with organic solvents may be used. Univalent alcohol, such as methanol, ethanol, and propanol, bivalent alcohol such as ethylene glycol, and trivalent alcohol such as glycerin may be used. When using the mixed solvent produced by mixing water with the organic solvent, the amount of the organic solvent contained in the mixed solvent may be set to any value according to the purpose. In general, when an appropriate amount of the organic solvent is added to the solvent, it becomes easy to control the particle diameters and particle size distribution.

4.1.4 Ratio Between Materials

In general, if the concentration of the source material containing the silica source material and the metal element M$_1$ that is added as required (hereinafter, the source material may be simply referred to as "silica source") is extremely low, it is not possible to produce the MSSs in high yield. Also, in this case, it is difficult to control the particle diameters and the particle size distribution, and the uniformity of the particle diameters decreases. Accordingly, the concentration of the silica source is preferably equal to or higher than 0.005 mol/L, and more preferably equal to or higher than 0.008 mol/L. If the concentration of the silica source is extremely high, the surfactant agent, which functions as the template for forming the mesopores, is relatively insufficient, and it is not possible to form the mesopores that are regularly arranged. Accordingly, the concentration of the silica source is preferably equal to or lower than 0.03 mol/L, and more preferably equal to or lower than 0.015 mol/L.

In general, if the concentration of the surfactant agent is extremely low, the template for forming the mesopores is insufficient, and it is not possible to form the mesopores that are regularly arranged. Accordingly, the concentration of the surfactant agent is preferably equal to or higher than 0.003 mol/L, and more preferably equal to or higher than 0.01 mol/L. If the concentration of the surfactant agent is extremely high, it is not possible to produce the MSSs in high yield. Accordingly, the concentration of the surfactant agent is preferably equal to or lower than 0.03 mol/L, and more preferably equal to or lower than 0.02 mol/L.

4.1.5 Reaction Condition

When a silane compound, such as alkoxysilane or hydroxyalkoxysilane, is used as the silica source material, the silane compound is used as the starting material. When a compound other than the silane compound is used as the silica source material, the silica source material is added to water (or an alcohol water solution produced by adding alcohol to water, as required), and a basic material, such as sodium hydroxide, is added in advance. It is preferable that the amount of the added basic material should be set so that the molar amount of the basic material is substantially equal to the molar amount of silicon atoms in the silica source material. If the basic material is added to the solution containing the silica source material other than the silane compound, a portion of Si—(O—Si)$_4$ bond, which has been already formed in the silica source material, is cut, and the homogenous solution is obtained. The amount of the basic material contained in the solution influences the yield and porosity of the MSSs. Therefore, after the homogenous solution is obtained, an excess of the basic material in the solution is neutralized by adding a dilute acid solution to the solution. It is preferable that the amount of the added dilute acid solution should be set so that the molar amount of the dilute acid solution is equal to a half to three-fourths of the molar amount of silicon atoms in the silica source material.

The silica source is added to the solvent containing a predetermined amount of the surfactant agent, to perform hydrolysis and polycondensation. Thus, the surfactant agent functions as the template, and the precursor particles containing silica and the surfactant agent are produced. Also, when the reaction condition is optimized, it is possible to produce the precursor particles with the radially-arranged pores and/or monodispersity.

The optimum reaction condition is selected according to, for example, the kind of the silica source material and the diameters of the precursor particles. In general, a reaction temperature is preferably −20 to 100° C., more preferably 0 to 80° C., and further preferably 10 to 40° C.

4.2 Diameter-Increasing Treatment

The synthesized precursor particles, or the synthesized precursor particles, from which the surfactant agent has been removed, may be used as the source material for producing the silica structure. However, in general, in the precursor particles that have been just produced, the pore diameters are relatively small. In order to produce the precursor particles or the MSSs that have relatively large pore diameters, it is preferable to perform treatment (diameter-increasing treatment) for increasing the pore diameters of the precursor particles. More specifically, in the diameter-increasing treatment, the synthesized precursor particles (from which the surfactant agent has not been removed) are hydrothermally-treated in a solution containing the diameter-increasing agent. By performing the treatment, it is possible to increase the pore diameters of the precursor particles.

4.2.1 Diameter-Increasing Agent

Examples of the diameter-increasing agent include alkylammonium halide, chain hydrocarbon, cyclic hydrocarbon, chain fatty amine, chain fatty alcohol, and hetero ring compounds. One of the above-described examples of the diameter-increasing agent may be used, or two or more of the above-described examples of the diameter-increasing agent may be used in combination. When alkylammonium halide is used as the diameter-increasing agent, a substitution reaction occurs between alkylammonium halide and the surfactant agent in the pores of the precursor particles, and thus, alkylammonium halide is introduced into silica. As a result, the diameters of the pores axe increased. When chain hydrocarbon, cyclic hydrocarbon, chain fatty amine, chain fatty alcohol, or a hetero ring compound is used as the diameter-increasing agent, the diameter-increasing agent is introduced from the solvent into the pores of the precursor particles with higher hydrophobicity, and thus, the pore diameters of the precursor particles are increased.

(1) Alkylammonium Halide

Alkylammonium halide is represented by the following general formula (b).

$$CH_3-(CH_3)_z-N^+(R_1)(R_2)(R_3)X^- \quad\quad (b)$$

In the formula (b), each of $R_1$, $R_2$, and $R_3$ represents an alkyl group with one to three carbon atoms. $R_1$, $R_2$, and $R_3$ may be the same, or may be different from each other. X represents a halogen atom. "z" is an integer that is in a range of 17 to 25, and that is larger than the value of "n" in the formula (a) representing alkylammonium halide used as the surfactant agent when the precursor particles are synthesized. $R_1$, $R_2$, and $R_3$, and X in the formula (b) have the same meanings as the meanings of $R_1$, $R_2$, and $R_3$, and X in the formula (a), respectively.

In general, in the general formula (b), "z" represents an integer in the range of 17 to 25. If "z" in alkylammonium halide is equal to or smaller than 16, it is difficult to sufficiently increase the pore diameters of the precursor particles. If "z" in alkylammonium halide is equal to or larger than 26, an alkyl chain is extremely large, and it is difficult to introduce alkylammonium halide into the precursor particles by causing the substitution reaction between alkylammonium halide and the surfactant agent used in the synthesis. "z" is preferably 20 to 25, and more preferably 22 to 24.

(2) Chain Hydrocarbon

Any chain hydrocarbon may be used as the diameter-increasing agent, and the kind of chain hydrocarbon is not particularly limited. However, it is preferable to use chain hydrocarbon in which the number of carbon atoms is 6 to 26 (more preferably 6 to 12). If the number of the carbon atoms of chain hydrocarbon is smaller than the lower limit, hydrophobicity of chain hydrocarbon tends to decrease, and it tends to be difficult to introduce chain hydrocarbon into the pores of the precursor particles. If the number of the carbon atoms of chain hydrocarbon is larger than the upper limit, solubility of chain hydrocarbon tends to decrease.

Examples of chain hydrocarbon include hexane, methylpentane, dimethylbutane, heptane, methylhexane, dimethylpentane, trimethylbutane, octane, methylheptane, dimethylhexane, trimethylpentane, isopropylpentane, nonane, methyloctane, ethylheptane, decane, undecane, dodecane, tetradecane, and hexadecane. It is preferable to use hexane, heptane, octane, nonane, decane, undecane, and dodecane, in terms of, for example, hydrophobicity and solubility.

(3) Cyclic Hydrocarbon

Any cyclic hydrocarbon may be used, as long, as a skeleton thereof includes cyclic hydrocarbon. The kind of cyclic hydrocarbon is not particularly limited. However, it is preferable to use cyclic hydrocarbon in which the number of rings is 1 to 3 and the number of carbon atoms is 6 to 20 (more preferably 6 to 16). If the number of the carbon atoms of cyclic hydrocarbon is smaller than the lower limit, hydrophobicity of cyclic hydrocarbon tends to decrease, and it tends to be difficult to introduce cyclic hydrocarbon into the pores of the precursor particles. If the number of the carbon atoms is larger than the upper limit, solubility of cyclic hydrocarbon tends to decrease, and therefore, it tends to be impossible to increase the pose diameters. If the number of the rings of cyclic hydrocarbon is larger than 3, the solubility tends to decrease, and therefore, it tends to be impossible to increase the pore diameters.

Examples of cyclic hydrocarbon include cyclohexane, cyclohexane, cyclohexadiene, benzene, methylbenzene, dimethylbenzene, trimethylbenzene, ethylbenzene, diethylbenzene, triethylbenzene, vinylbenzene, divinylbenzene, isopropylbenzene, diisopropylbenzene, triisopropylbenzene, indent, naphthalene, tetralin, azulene, biphenylene, acenaphthylene, fluorene, phenanthrene, and anthracene. It is preferable to use cyclohexane, benzene, trimethylbenzene, triethylbenzene, triisopropylbenzene, and naphthalene, in terms of hydrophobicity and solubility.

(4) Chain Fatty Amine

Any chain fatty amine may be used, and the kind of chain fatty amine is not particularly limited. However, it is preferable to use chain fatty amine in, which the number of carbon atoms is 6 to 26 (more preferably 6 to 20). If the number of the carbon atoms of chain fatty amine is smaller than the lower limit, hydrophobicity of chain fatty amine tends to decrease, and it tends to be difficult to introduce chain fatty amine into the pores of the precursor particles. If the number of the carbon atoms is larger than the upper limit, solubility of chain fatty amine tends to decrease.

Examples of chain fatty amine include hexylamine, methylpentylamine, dimethylbutylamine, heptylamine, methylhexylamine, dimethylpentylamine, trimethylbutylamine, octylamine, methylheptylamine, dimethylhexylamine, trimethylpentylamine, isopropylpentylamine, nonylamine, methyloctylamine, ethylheptylamine, decylamine, undecylamine, dodecylamine, tetradecylamine, hexadecylamine, N,N'-dimethyl-n-hexylamine, N,N'-dimethyl-n-octylamine; N,N'-dimethyl-n-decylamine, N,N'-dimethyl-n-dodecylamine, N,N'-dimethyl-n-tetradecylamine, and N,N'-dimethyl-n-palmitylamine. It is preferable to use N,N'-dimethyl-n-decylamine, N,N'-dimethyl-n-dodecylamine, N,N'-dimethyl-n-tetradecylamine, and N,N'-dimethyl-n-palmitylamine, in terms of hydrophobicity and solubility.

(5) Chain Fatty Alcohol

Any chain fatty alcohol may be used, and the kind of chain fatty alcohol is not particularly limited. However, it is preferable to use chain fatty alcohol in which the number of carbon atoms is 6 to 26 (more preferably 6 to 20). If the number of the carbon atoms of chain fatty alcohol is smaller than the lower limit, hydrophobicity of chain fatty alcohol tends to decrease, and it tends to be difficult to introduce chain fatty alcohol into the pores of the precursor particles. If the number of the carbon atoms of chain fatty alcohol is larger than the upper limit, solubility of chain fatty alcohol tends to decrease.

Examples of chain fatty alcohol include hexanol, methylpentanol, dimethylbutanol, heptanol, methylhexanol, dimethylpentanol, trimethylbutanol, octanol, methylheptanol, dimethylhexanol, trimethylpentanol, isopropylpentanol, nonanol, methyloctanol, ethylheptanol, decyl alcohol, undecyl alcohol, dodecyl alcohol, tetradecyl alcohol, and hexadecyl alcohol. It is preferable to use hexanol, octanol, and decanol, in terms of hydrophobicity and solubility.

(6) Hetero Ring Compounds

Any hetero ring compound may be used, as long as a skeleton thereof includes a hetero ring. The kind of the hetero ring compound is not particularly limited. However, it is preferable to use a hetero ring compound in which the number of rings is 1 to 3, the number of carbon atoms is 4 to 18 (more preferably 5 to 12), and hetero atoms are at least one kind of hetero atoms selected from a group constituting of nitrogen, oxygen, and sulfur. If the number of the carbon atoms of a hetero ring compound is smaller than the lower limit, hydrophobicity of the hetero ring compound tends to decrease, and it tends to be difficult to introduce the hetero ring compound into the pores of the precursor particles. If the number of the carbon atoms is larger than the upper limit, solubility of the hetero ring compound tends to decrease, and therefore, it tends to be impossible to increase the pore diameters. If the number of rings of a hetero ring compound is larger than 3, the solubility of the hetero ring compound tends to decrease, and therefore, it is not possible to increase the pore diameters.

Examples of the hetero ring compound include pyrrole, thiophene, furan, pyridine, pyrazine, pyrimidine, pyridazine, indole, quinoline, phthalazine, naphthyridine, quinoxaline, quinazoline, carbazole, phenanthridine, acridine, phenanthroline, and phenazine. It is preferable to use pyridine, quinoline, acridine, and phenanthroline, in terms of hydrophobicity and solubility.

4.2.2. Solution Composition

As the solvent, the mixed solvent of water and alcohol is used. Examples of alcohol include univalent alcohol, such as methanol, ethanol, and propanol, bivalent alcohol such as ethylene glycol, and trivalent alcohol such as glycerin. The content of alcohol in the solvent needs to be 40 to 90% by volume. The content of alcohol is preferably 50 to 85% by volume, and more preferably 55 to 75% by volume. If the content of alcohol in the solvent is higher than 90% by volume, the substitution reaction between the surfactant agent and alkylammonium halide in the pores does not sufficiently proceed, and chain hydrocarbon, cyclic hydrocarbon, chain fatty amine, chain fatty alcohol, or a hetero ring compound is not sufficiently introduced into the pores. If the content of alcohol in the solvent is lower than 40% by volume, the proportion of water is high, and therefore, alkylammonium halide with a long alkyl chain, chain hydrocarbon, cyclic hydrocarbon, chain fatty amine, chain fatty alcohol, or a hetero ring compound is not sufficiently dissolved in the solvent. Further, the shape of the precursor particle, in which restructuring of a silica network has been promoted, is changed, or the silica network of the precursor particle is broken, due to high-temperature water.

Further, the concentration of the diameter-increasing agent in the solvent needs to be 0.05 to 10 mol/L (preferably 0.05 to 5 mol/L, and more preferably 0.1 to 1 mol/L) based on the entire volume of the solution. The upper limit value of the concentration of the diameter-increasing agent in the solvent is further preferably 0.2 mol/L, and further more preferably 0.18 mol/L based on the entire volume of the solution. If the concentration of the diameter-increasing agent is lower than 0.05 mol/L, the substitution reaction between the surfactant agent and alkylammonium halide in the pores does not sufficiently proceed, and chain hydrocarbon, cyclic hydrocarbon, chain fatty amine, chain fatty alcohol, or a hetero ring compound is not sufficiently introduced into the pores. Thus, the regularity of the diameters of the produced particles and the regularity of the pore structure decrease, and further, it is not possible to sufficiently increase the pore diameters. If the concentration of the diameter-increasing agent is higher than 10 mol/L, it is not possible to control the particle diameters and the particle diameter distribution, and thus, the uniformity of the diameters of the produced particles decreases.

4.2.3 Treatment Condition

The diameter-increasing treatment needs to be performed under the temperature condition of 60 to 150° C., preferably under the temperature condition of 70 to 120° C. The upper limit of the temperature condition is more preferably 100° C. (further preferably 90° C., and further more preferably 80° C.). If the diameter-increasing treatment is performed at a temperature lower than 60° C., the substitution reaction between the surfactant agent contained in the precursor particles and alkylammonium halide used as the diameter-increasing agent does not sufficiently proceed, and chain hydrocarbon, cyclic hydrocarbon, chain fatty amine, chain fatty alcohol, or a hetero ring compound is not sufficiently introduced into the pores. If the diameter-increasing treatment is performed at a temperature higher than 150° C., it is difficult to control the particle diameters and the particle diameter distribution.

4.3 Removal of the Surfactant Agent

When the surfactant agent (and the diameter-increasing agent added as required) is(are) removed from the precursor particles after drying is performed, the MSSs are produced. Examples of the method of removing the surfactant agent include (1) a calcination method in which the precursor particles are calcined at 300 to 1000° C. (preferably at 300 to 600. ° C.) for 30 minutes or longer (preferably for one hour or longer) in the atmosphere or under an inert atmosphere; and (2) an ion exchange method in which the precursor particles are immersed in a good solvent (for example, methanol containing a small amount of hydrochloric acid) for the surfactant agent or the diameter-increasing agent, and agitated while heated at a predetermined temperature (for example, 50 to 70° C.) so that the surfactant agent is extracted from the precursor particles.

Figure 1A:
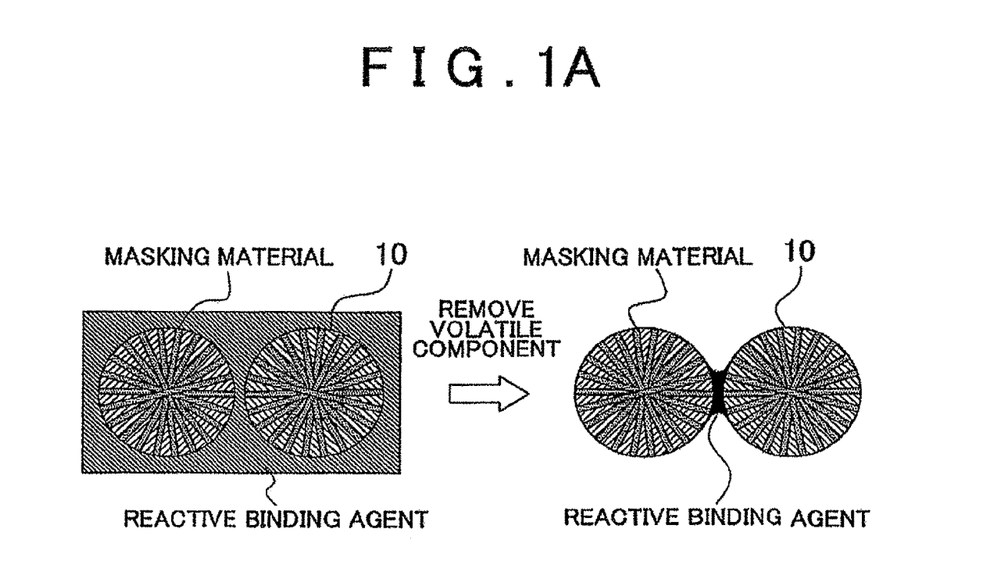
FIG. 1A shows a principle of connecting mesoporous silica spheres (MSSs) to each other at a contact point.
Figure 1B:
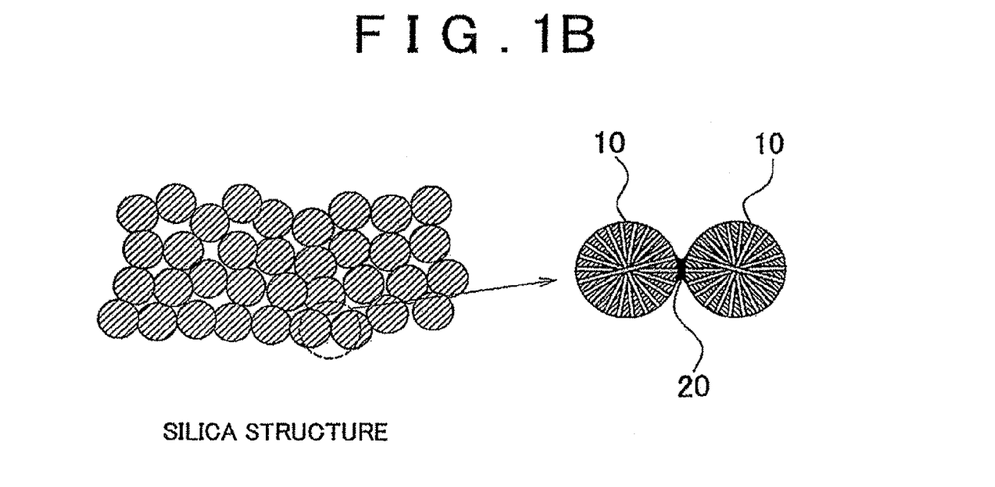
FIG. 1B is a conceptual diagram showing a silica structure according to an embodiment of the invention.

5. The Silica Structure and the Method of Producing the Silica Structure, and Advantageous Effects of the Heat Insulating Material FIGS. 1A and 1B are conceptual diagrams showing the silica structure produced using the reactive binding agent in the form of a liquid, and the method of producing the silica structure. As shown in FIG. 1A, when a small amount of the solution containing the reactive binding agent is added to the MSSs 10 in which the pores are filled with the masking material, and is sufficiently mixed with the MSSs 10, the masking material suppresses entry of the reactive binding agent into the pores. When a volatile component is removed from the mixture in this state, the liquid containing the reactive binding agent is left only between the particles of the MSSs 10. Then, the mixture is shaped into an appropriate shape. When an external stimulus, such as heat or light, is applied to the reactive binding agent, the reactive binding agent is polymerized, while the reactive binding agent reacts with the outer surfaces of the MSSs 10. As a result, it is possible to produce the structure in which the particles of the MSSs 10 are connected by the connection portions 20 including metal oxide. Further, by performing treatment on the produced structure for removing the masking material (for example, by performing oxidizing treatment), the silica structure, in which the MSSs 10 are connected by the connection portions 20, is produced as shown in FIG. 1B.

Because the mesopores are formed inside the MSSs, the pore volume of the MSSs is high, the bulk density of the MSSs is low, and the heat conductivity of the MSSs is low. Also, the MSS has high rigidity. Particularly, the MSS (MMSS) with the radially-arranged pores receives an external force in the lengthwise direction of the cylindrical pores no matter in which direction the MSS (MMSS) is deformed. Therefore, the MSS (MMSS) has high rigidity. Further, the bulk density, the heat conductivity, and the strength of the MSSs with the radially-arranged pores are not greatly changed even when the diameters of the MSSs are changed. This is because the internal structure of tire MSS with the radially-arranged pores is not changed even when the diameter of the MSS is changed. The silica structure, in which the MSSs are connected by the connection portions, has high strength, low bulk density, and low heat conductivity. Particularly, the silica structure, in which the MSSs with the radially-arranged pores are connected to each other substantially at a point, has high rigidity and low bulk density. Also, heat transfers along walls of the radially-arranged pores in each particle, and heat transfers between the particles through the contact point. Therefore, it is possible to reduce the heat conductivity to a low value. Particularly, when using the MSSs (MMSSs) that have monodispersity instead of or in addition to the radially-arranged pores, the distances between the particles are uniform, and it is possible to suppress an increase in the number of the contact points.

EXAMPLES

First Example

1. Production of a Specimen 1.1. Production of the Monodispersed Mesoporous Silica Spheres Octadecyltrimethylammonium chloride ($C_{18}$TMACl) was dissolved in a mixed solvent produced by mixing 3166 g of purified water with 4770 g of methanol (MeOH), and the solution was agitated while the temperature was maintained at 25° C. Further, 26.4 g of tetramethoxysilane (TMOS), which was diluted by 34.2 g of 1M NaOH and 30 g. of MeOH, was added to the solution. Then, the solution was agitated for approximately 8 hours, and was statically placed for one night. Then, a process, in which the solution was filtered and a filtrate was dispersed again in purified water, was performed twice. Then, drying was performed at 45° C., and thus, 19.25 g of white powder (i.e., the MMSSs in which the pores were filled with the surfactant agent) was produced.

1.2 Diameter-Increasing Treatment

In a mixed solvent produced by mixing 297 mL of purified water with 243 mL of EtOH, 9 g of the produced white powder was dispersed by ultrasonic treatment. Further, 19.3 g of trimethylbenzene (TMB) was added to the solution, and the solution was agitated. The solution, in which complexes were dispersed, was placed in an autoclave that, includes an inner cylinder container with a volume of 1 L, and hydrothermal treatment was performed at 100° C. for three days. After the hydrothermal treatment was performed, the autoclave was cooled, and depressurized, and then, a product was taken out. A process, in which the product was filtered, and a filtrate was dispersed in EtOH again, was performed twice. Thus, washing was performed. Then, drying was performed at 45° C. As a result, the MMSSs with a large pore diameter, in which the pores were filled with the surfactant agent and TMB, were produced. The surfactant agent and TMB serve as the masking material. Using the specimen that was calcined at 550° C. for 6 hours, it was confirmed that in the produced MMSSs with the large pore diameter, the pore diameter was 6 nm, and the pore volume was 1.55 mL/g.

1.3 Production of the Silica Structure 7.5 mg of polytetrafluoroethylene (PTFE) powder and 45 μL of TEOS were added to 150 mg of the MMSSs with the large pore diameter in which the pores were filled with the masking material, and kneading was performed in a mortar. The obtained mixture was shaped at a pressure of 20 MPa into a shape with a diameter φ of 13 mm, using a hand press. The formed body was calcined in air at 550° C. for 6 hours, and thus, the silica structure was produced.

2. Evaluation

Figure 2:
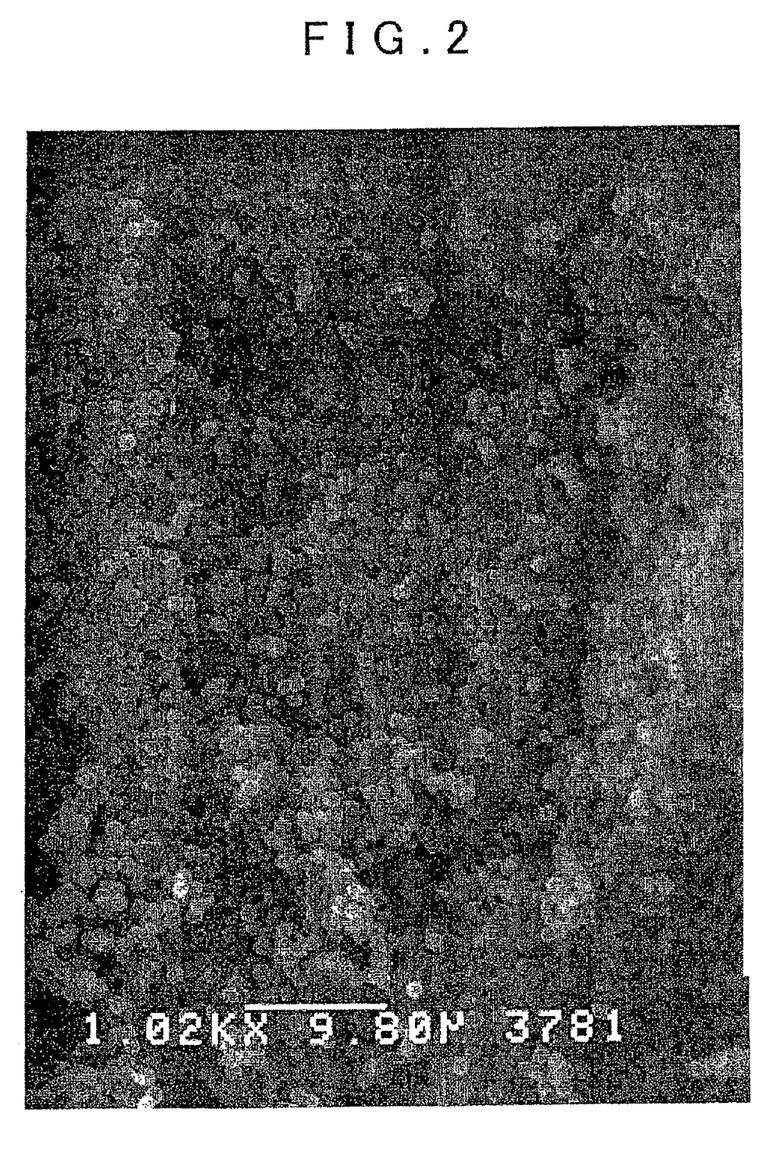
FIG. 2 is a Scanning Electron Microscope (SEM) photo showing a fractured surface of a silica structure produced in a first example.

The fractured surface of the formed body was observed using a Scanning Electron Microscope (SEM). Thus, a structure, in which the spherical MMSSs were connected, was observed (refer to FIG. 2). The produced silica structure had bulk, density of 0.45 g/mL, compressive strength of 10.2 MPa, and heat conductivity of 0.05 W/mK.

Second Example

The silica structure was produced according to the same procedure as the procedure in the first example, except that the pressure of the hand press was set to 60 MPa. The produced silica structure had bulk density of 0.55 g/mL, compressive strength of 19.8 MPa, and heat conductivity of 0.08 W/mK.

Third Example

1. Production of a Specimen 1.1 Production of the MMSSs with a Large Pore Diameter The MMSSs with a large pore diameter, in which the pores were filled with the masking material, were produced according to the same procedure, as the procedure in the first example. Further, the MMSSs were calcined at 550° C. for 6 hours, and thus, the MMSSs with a large pore diameter (the pore diameter: 6 nm, the pore volume: 155 mL/g) were produced.

1.2 Supply of the Masking Material 0.5 g of the MMSSs with the large pore diameter were placed in a container made of PFA (with a volume of 15 mL), and furfuryl alcohol (FA) was added in accordance with the pore volume, and furfuryl alcohol entered the pores of silica. Then, the MMSSs were heat-treated at 150° C. for 24 hours. Thus, FA was polymerized in the pores and the pores were filled with polyfurfuryl alcohol (PFA). The PFA serves as the masking material.

1.3 Production of the Silica Structure 7.5 mg of PTFE powder and 45 μL of TEOS were added to 150 mg of the MMSSs with the large pore diameter in which the pores were filled with the masking material, and kneading was performed in a mortar. The obtained mixture was shaped at a pressure of 20 MPa into a shape with a diameter φ of 13 mm, using a hand press. The formed body was calcined in air at 550° C. for 6 hours, and tints, the silica structure was produced.

2. Evaluation

The produced silica structure had bulk density of 0.46 g/mL, compressive strength of 13.2 MPa, and heat conductivity of 0.06 W/mK.

Fourth Example

1. Production of a Specimen 1.1 Production of the MMSSs

The MMSSs, in which the pores were filled with the surfactant agent, were produced in the same manner as the manner described in the section 1.1 of the first example. The MMSSs were not subjected to the diameter-increasing treatment. Using the specimen that was calcined at 550° C., it was confirmed that the pore diameter was 2.2 nm). The surfactant agent serves as the masking material.

1.2 Production of the Silica Structure 7.5 mg of PTFE powder and 45 μL of TEOS were added to 150 mg of the MMSSs with the large pore diameter in which the pores were filled with the masking material, and kneading was performed in a mortar. The obtained mixture was shaped at a pressure of 20 MPa into a shape with a diameter φ of 13 mm, using a hand press. The formed body was calcined in air at 550° C. for 6 hours, and thus, the silica structure was produced.

2. Evaluation

The produced silica structure had bulk density of 0.56 g/mL, compressive strength of 21.0 MPa, and heat conductivity of 0.09 W/mK.

Fifth Example

1. Production of a Specimen 1.1 Production of the MMSSs with a Large Pore Diameter The MMSSs with a large pore diameter, in which the pores were filled with the surfactant agent and TMB, were produced in the same manner as in the first example. The surfactant agent and TMB serve as the masking material. Using the specimen that was calcined at 550° C. for 6 hours, it was confirmed that in the MMSSs with the large pore diameter, the pore diameter was 6 nm, and the pore volume was 1.55 mL/g.

1.2 Production of the Silica Structure 7.5 mg of PTFE powder and 45 μL of titanium isopropoxide were added to 150 mg of the MMSSs with the large pore diameter in which the pores were filled with the masking material, and kneading was performed in a mortar. The obtained mixture was shaped at a pressure of 20 MPa into a shape with a diameter φ of 13 mm, using a hand press. The formed body was calcined in air at 550° C. for 6 hours, and thus, the silica structure was produced.

2. Evaluation

The produced silica structure had bulk density of 0.45 g mL, compressive strength of 11.2 MPa, and heat conductivity of 0.05 W/mK.

First Comparative Example 1.1 Production of a Specimen

The MMSSs, in which the pores were filled with the surfactant agent, were produced in the same manner as the manner in the fourth example described in [1.1], 7.5 mg of PTFE powder was added to 150 mg of the MMSSs without adding TEAS to the MMSSs, and kneading was performed in a mortar. The obtained mixture was shaped at a pressure of 20

MPa into a shape with a diameter φ of 13 mm, using a hand press. The formed body was calcined in air at 550° C. for 6 hours. However, the MMSSs were not connected to each other, and the formed body was broken.

While the invention has been described with reference to embodiments thereof, it is to be understood that the invention is not limited to the embodiments. Various modifications may be made without departing from the scope of the invention.

The silica structure and the method of producing the same according to the invention may be employed as a heat insulating material, an acoustic absorption material, a filter, a weight-saving material, an adsorbing material, a catalyst support, and a separation membrane support, and the method of producing the same.

The invention claimed is:

1. A method of producing a silica structure, comprising:
    mixing mesoporous silica spheres, in which pores are filled with a masking material, with a liquid containing a reactive binding agent to produce a mixture;
    shaping the produced mixture;
    causing the reactive binding agent to react to form connection portions each of which includes metal oxide, and each of which is located between the mesoporous silica spheres; and
    removing the masking material from the pores.

2. The method according to claim 1, wherein the reactive binding agent is an alkoxide.

3. The method according to claim 1, wherein
    in mixing the mesoporous silica spheres with the liquid containing the reactive binding agent, the liquid containing the reactive binding agent is added so that the mesoporous silica spheres are connected to each other at a contact point.

4. The method according to claim 3, wherein
    in mixing the mesoporous silica spheres with the liquid containing the reactive binding agent, the liquid containing the reactive binding agent is added so that an amount of the connection portions including the metal oxide is equal to or smaller than 40 weight parts with respect to 100 weight parts of the mesoporous silica spheres.

5. The method according to claim 4, wherein
    in mixing the mesoporous silica spheres with the liquid containing the reactive binding agent, the liquid containing the reactive binding agent is added so that the amount of the connection portions including the metal oxide is equal to or smaller than 20 weight parts with respect to 100 weight parts of the mesoporous silica spheres.

* * * * *